US00RE35796E

United States Patent [19]

Olson

[11] E Patent Number: Re. 35,796

[45] Reissued Date of Patent: May 19, 1998

[54] SELF-ENERGIZING SYNCHRONIZER

[75] Inventor: Otis J. Olson, Farmington Hills, Mich.

[73] Assignee: Eaton Corporation, Cleveland, Ohio

[21] Appl. No.: 617,950

[22] Filed: Mar. 13, 1996

Related U.S. Patent Documents

Reissue of:

[64] Patent No.: 5,078,244
Issued: Jan. 7, 1992
Appl. No.: 632,880
Filed: Dec. 24, 1990

U.S. Applications:

[63] Continuation of Ser. No. 382,945, Feb. 1, 1995, abandoned, which is a continuation of Ser. No. 112,296, Aug. 27, 1993, abandoned.

[51] Int. Cl.[6] ..... F16D 23/06

[52] U.S. Cl. ..... 192/53.31; 192/53.332; 74/339

[58] Field of Search ..... 192/53.31, 53.331, 192/53.332; 74/339

[56] References Cited

U.S. PATENT DOCUMENTS

| | | | |
|---|---|---|---|
| 2,238,723 | 4/1941 | Fishburn | 192/53 F X |
| 2,410,511 | 11/1946 | Letsinger et al. | 192/53 |
| 2,555,961 | 6/1951 | Dunn | 192/53 E |
| 2,627,955 | 2/1953 | Perkins | 192/53 |
| 2,667,955 | 2/1954 | Bixby | 192/53 |
| 2,896,760 | 7/1959 | Hebbinghaus | 192/53 |
| 2,930,462 | 3/1960 | Willis | 192/53 F |
| 2,942,712 | 6/1960 | Altmann | 192/114 |
| 2,978,083 | 4/1961 | Henyon | 192/114 |
| 3,001,413 | 9/1961 | Burckhardt | 74/359 |
| 3,221,851 | 12/1965 | Vandervoort | 192/53 |
| 3,548,983 | 12/1970 | Hiraiwa | 192/53 |
| 3,692,163 | 9/1972 | Ruettinger | 192/53 |
| 3,804,218 | 4/1974 | Krutashov | 192/53 |
| 3,910,390 | 10/1975 | Eichinger | 192/53 |
| 4,018,319 | 4/1977 | Thomas | 192/53 |
| 4,125,179 | 11/1978 | Cochran et al. | 192/53 |
| 4,185,725 | 1/1980 | Maina | 192/53 |
| 4,413,715 | 11/1983 | Michael et al. | 192/53 |
| 4,478,321 | 10/1984 | De Franco et al. | 192/53 |
| 4,620,623 | 11/1986 | Barksdale | 192/53 |
| 4,623,054 | 11/1986 | Barksdale | 192/53 |
| 4,624,352 | 11/1986 | Yarnell | 192/53 |
| 4,732,247 | 3/1988 | Frost | 192/53 |
| 4,836,348 | 6/1989 | Knodel et al. | 192/53 |
| 4,869,353 | 9/1989 | Ohtsuki et al. | 192/53 |

FOREIGN PATENT DOCUMENTS

| | | |
|---|---|---|
| 1098824 | 2/1961 | Germany . |
| 45-27483 | 9/1970 | Japan . |
| 2101240 | 1/1983 | United Kingdom . |

*Primary Examiner*—Richard M. Lorence
*Attorney, Agent, or Firm*—Paul S. Rulon; Howard D. Gordon

[57] ABSTRACT

A pin-type, double-acting synchronizer mechanism (22) with friction clutches (24,36 and 26,38), jaw clutches (28, 14b and 30,16b), and self-energizing ramps. The ramps act between a shaft (12) and a shift flange (32). The shift flange is rotatable relative to the shaft and jaw clutch members (28,30), and defines three reaction portions (32b) which act against three sets of ramps (52a,52b,52c,52d) defined by an annular sleeve assembly (30). The assembly (30) is fixed against rotational and axial movement relative to the shaft. The angles of the self-energizing ramps may be varied to provide substantially the same synchronizing time for several or all of the ratio gears in a multi-ratio transmission. Three circumferentially spaced pins (40) include blocker shoulders (40c,40d) for preventing asynchronous engagement of the jaw clutches. Three pre-energizer assemblies (42) effect initial engagement of the friction clutches to ensure engagement of the blocker shoulders.

37 Claims, 2 Drawing Sheets

SELF-ENERGIZING SYNCHRONIZER

Matter enclosed in heavy brackets [ ] appears in the original patent but forms no part of this reissue specification; matter printed in italics indicates the additions made by reissue.

*This is a continuation of reissue application Ser. No. 08/382,945 filed on Feb. 1, 1995, now abandoned, which is a continuation of reissue application Ser. No. 08/112,296 filed on Aug. 27, 1993, now abandoned, as a reissue of U.S. Pat. No. 5,078,244 granted Jan. 2, 1992.*

CROSS-REFERENCE TO RELATED APPLICATIONS

This application is related to U.S. application Ser. Nos. 632,881, 632,882, 632,883, 632,884, 633,703, 633,704, 633,738, 633,739, 633,743, 633,744, all filed Dec. 24, 1990, all assigned to the assignee of this application, and all incorporated herein by reference.

FIELD OF THE INVENTION

This invention relates to synchronizer mechanisms for a transmission. More specifically, the invention relates to such mechanisms of the self-energizing type.

BACKGROUND OF THE INVENTION

It is well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. Prior art examples of such mechanisms may be seen by reference to U.S. Pat. Nos. 2,410,511; 2,896,760; 3,548,983; 4,413,715; 4,836,348; and 4,869,353 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of and additive to the shift force for further increasing the synchronizing torque of the friction members.

The structure of the synchronizer mechanisms in these patents differs substantially from the structure of pin-type synchronizer mechanisms. Due, at least in part, to these structural differences, it has been difficult to provide pin-type synchronizer mechanisms with the self-energizing feature mentioned above.

Further, while the synchronizer mechanisms of these patents may well have reduced shift time and shift effort, they have not taken into account varying shift requirements for the whole transmission, i.e., lower speed ratio gears in general require more shift effort and/or time than do high gear speed ratios, and that down shifts in general require more effort and/or time than do upshifts.

SUMMARY OF THE INVENTION

An object of this invention is to provide a pin-type synchronizer with a shift flange which is disposed for limited rotation relative to a jaw clutch axially moved by the flange.

Another object of this invention is to provide such a pin-type synchronizer mechanism with self-energizing means.

According to a feature of the invention, a pin-type synchronizer mechanism, as disclosed in U.S. Pat. No. 4,462,489, includes first friction and jaw means respectively engagable with second friction and jaw means for respectively synchronizing and positive connecting a gear to a shaft in response to an axial shift force axially moving a radially extending flange. Connecting means are provided for effecting axial movement of the first jaw means in response to axial movement of the flange. The first jaw means has a plurality of internal spline teeth mating with external spline teeth affixed to the shaft for allowing axial and preventing rotational movement of the first jaw means relative to the shaft. The second friction and jaw means are affixed to the gear. First and second blocker means are operative when engaged for preventing engagement of the jaw means prior to the synchronizing. The first blocker means are defined by a plurality of circumferentially spaced pin-like means rigidly extending axially from the first friction means and into openings in the flange. The second blocker means are defined about the openings. Pre-energizer means are provided to engage the friction means in response to initial axial movement of the flange by the shift force from a neutral position toward the gear for engaging the blocker means in response to engagement of the friction means producing a synchronizing torque transmitted to the flange via the pin-like means and for transmitting the shift force to the first friction means via the blocker means to increase the engaging force of the friction means.

The improvement is characterized by:

means for allowing limited circumferential movement of the flange relative to the shaft and reacting the synchronizing torque to the flange.

According to a further feature of the invention, the means for allowing includes first ramp means engagable with reaction means affixed with the flange in response to synchronizing torque in one rotational direction for producing an axial additive force on the flange in the direction of the shift force for further increasing the force engaging the friction means.

BRIEF DESCRIPTION OF THE DRAWINGS

The synchronizer mechanism of the invention is shown in the accompanying drawings in which.

DETAILED DESCRIPTION OF THE DRAWINGS

Figure 1:
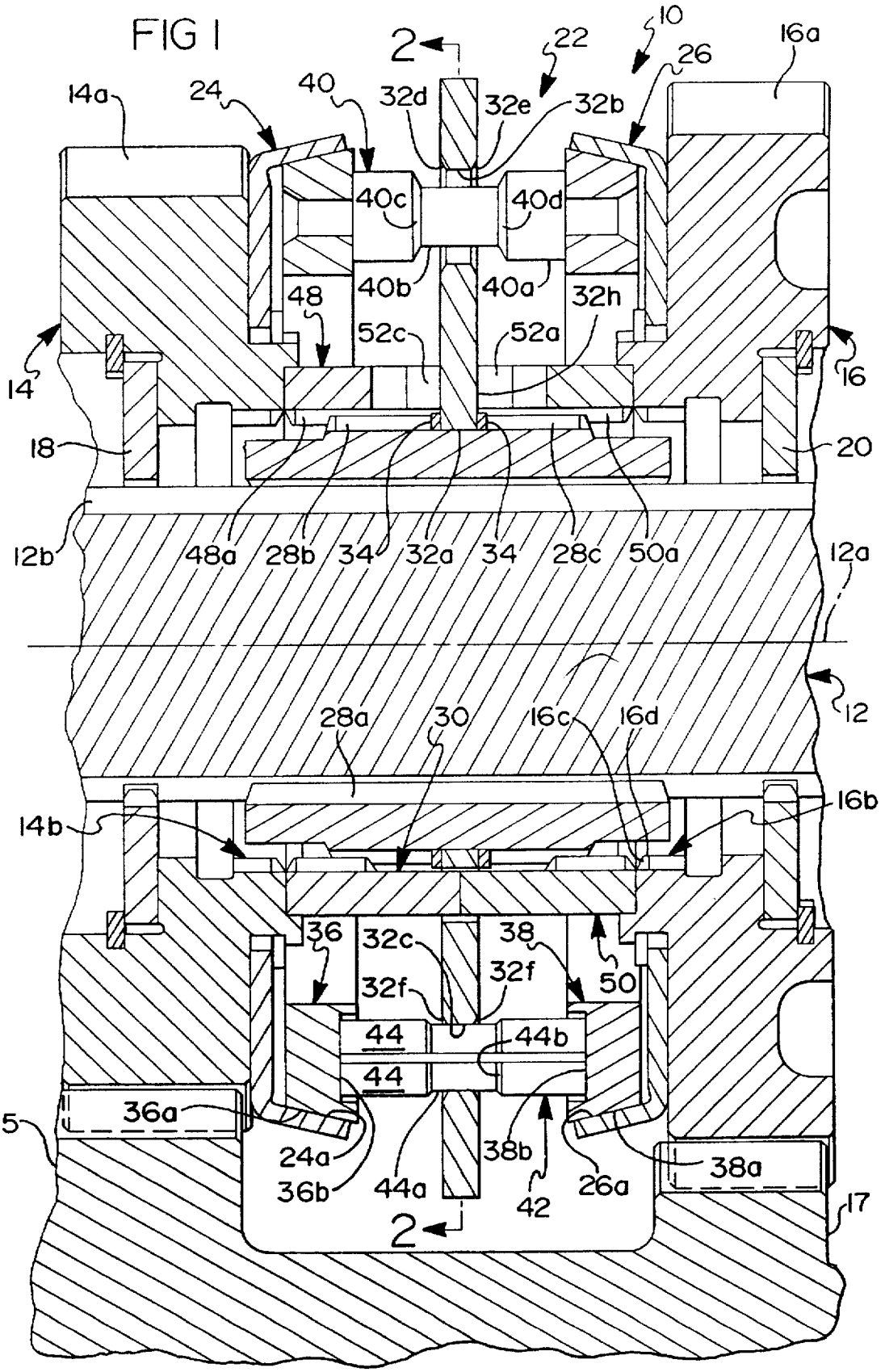
FIG. 1 is a sectional view a double-acting synchronizer looking along line 1—1 of FIG. 2.
Figure 2:
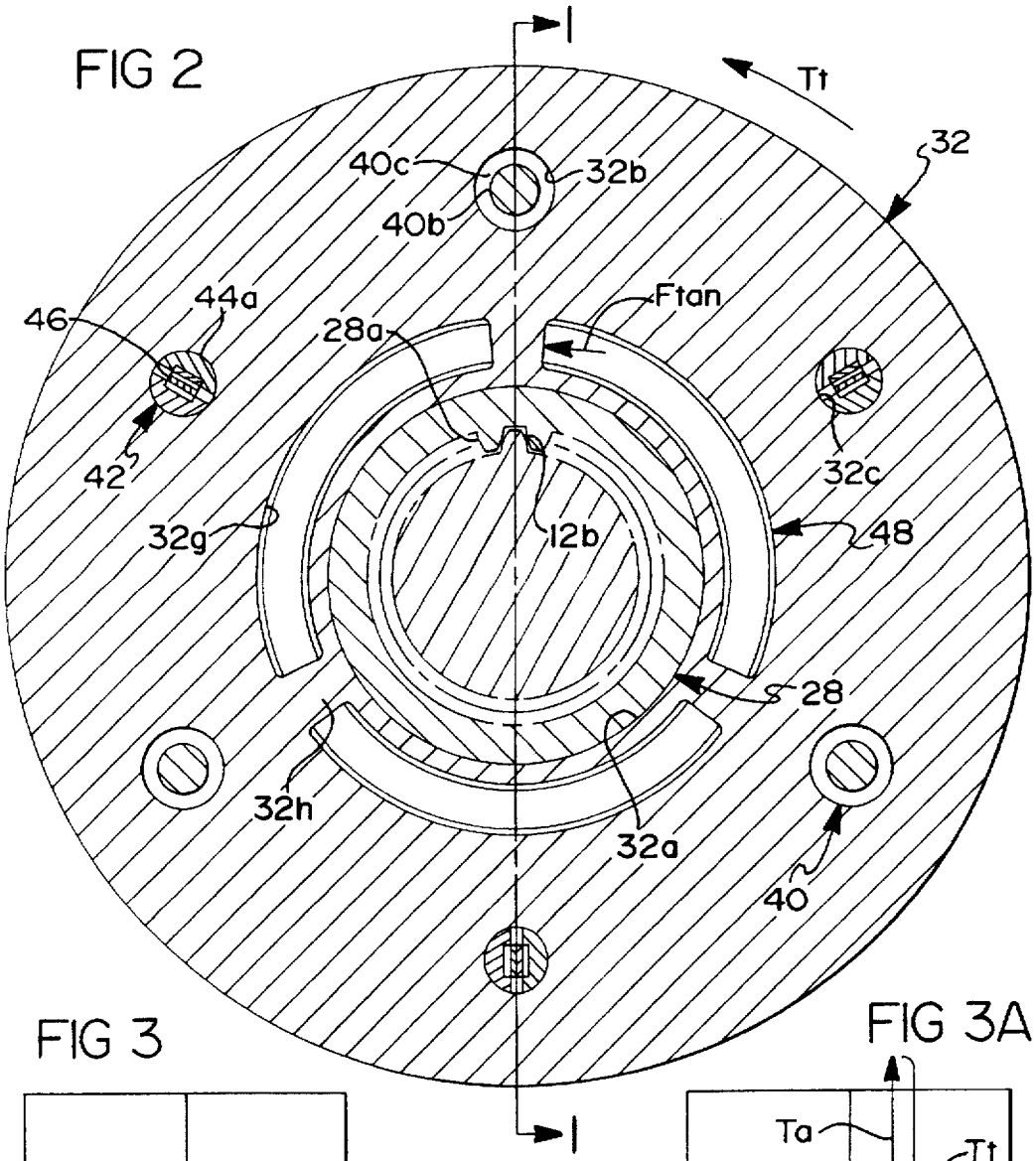
FIG. 2 is a partially sectioned view looking along line 2—2 of FIG. 1.

Looking first mainly at FIGS. 1 and 2, therein is shown a gear and synchronizer assembly 10 for an otherwise unshown transmission of the type intended for use in a land vehicle, particularly of the type used in heavy duty trucks. However, assembly 10 may be used in other applications.

The assembly includes a shaft 12 mounted for rotation about a central axis 12a in unshown manner, spaced apart ratio gears 14, 16 rotatably supported on the shaft and secured against axial movement relative to the shaft by annular thrust members 18, 20 affixed to the shaft in known manner, and a double-acting pin-type synchronizer clutch mechanism 22. When assembly 10 is part of a twin countershaft transmission, such as disclosed in U.S. Pat. Nos. 3,648,546 and 4,788,889, which patents are incorporated herein by reference, teeth 14a, 16a on the gears will be in constant mesh with engine driven gears 15, 17 on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into.

The synchronizer mechanism 22 includes annular friction members 24, 26 and annular jaw clutch members 14b, 16b affixed to gears 14, 16, a jaw clutch member 28 having internal spline teeth 28a slidably mating with external spline teeth 12b integrally formed with the shaft or otherwise affixed thereto, an annular sleeve 30 having self-energizing ramps, a radially extending shift flange 32, having a radially inner extent 32a secured against axial movement relative to jaw clutch member 28 by thrust members 34 which allow relative rotation between the flange and jaw member, annular friction members or rings 36, 38 rigidly secured together by three circumferentially spaced apart pins 40 extending axially from each of the friction members and through openings 32b in the flange, and three circumferentially spaced apart pre-energizer assemblies 42 of the spline pin-type extending axially between the friction members and through openings 32c alternately spaced between openings 32b. Alternatively, synchronizer mechanism 22 may be of the single acting pin-type, i.e. configured to synchronize and jaw clutch only one gear to a shaft; such a mechanism is disclosed in U.S. Pat. No. 3,221,851 which is incorporated herein by reference. Pins 40 may be more or less in number than disclosed herein and other types of pre-energizer assemblies 42 may be used.

As is readily seen, friction members 24, 36 and 26, 38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or, as is known in the art, they may be formed integral with the gears. Friction members 24, 26 have internal cone friction surfaces 24a, 26a which respectively mate with external cone friction surfaces 36a, 38a. Members 24, 26 and 36, 38 also are respectively referred to as synchronizer cups and rings.

A wide range of cone angles may be used; herein, cone angles of between twelve degrees and seven and one-half degrees are contemplated. The friction surfaces 36a, 38a and/or 24a, 26a may be defined by any of several known friction materials affixed to the base member; herein, a pyrolytic carbon friction material, such as disclosed in U.S. Pat. Nos. 4,700,823; 4,844,218; and 4,778,548 are preferred. These patents are incorporated herein by reference.

Each pin 40 includes major diameter portions 40a having diameters slightly less than the diameter of flange openings 32b, a reduced diameter or groove portion 40b spaced between friction rings 36, 38 (herein midway), and conical blocker shoulders or surfaces 40c, 40d extending radially outward from the pin axis and axially away from each other at angles relative to a line normal to the pin axis which provide blocking until synchronism is substantially reached. The grooved portions, when disposed within their respective flange openings, allow limited rotation of the rigid friction ring and pin assembly relative to the flange to effect engagement of the pin blocker shoulders with chamfered blocker shoulders 32d, 32e defined about the flange openings.

Pre-energizer assemblies 42 are of the split pin-type disclosed in U.S. Pat. No. 4,252,222 which is incorporated herein by reference. Each assembly 42 includes a pair of semi-cylindrical shell halves 44 having a major diameter less than the diameter of openings 32c when squeezed together, semi-annular grooves 44a with chamfered ends 44b and a leaf spring 46 for biasing the annular grooves apart to engage the groove chamfers with flange chamfers 32f formed about opposite ends openings 32c. The ends of the shell halves 44 abut friction rings 36, 38 and are disposed within elongated recesses 36b, 38b therein.

Figure 3:
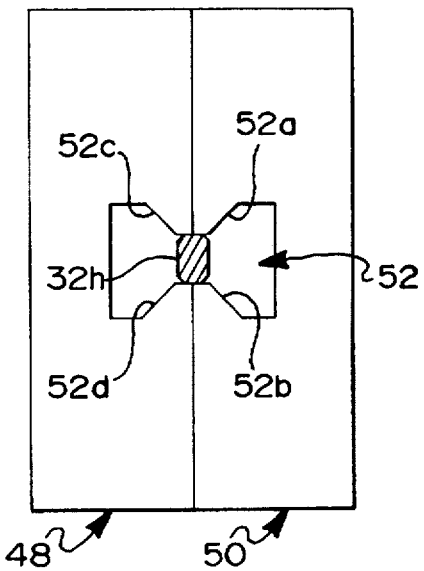
FIGS. 3 and 3A illustrate a self-energizing ramp portion of the mechanism in FIGS. 1 and 2.

Annular sleeve assembly 30 includes sleeve members 48, 50 axially sandwiched together and retained against axial movement relative to shaft 12 by gears 14, 16. Sleeve members 48, 50 include internal spline teeth 48a, 50a which slidably mate with external splines or jaw teeth 28b, 28c. The mating splines 48a, 50a and 28b, 28c prevent relative rotation between sleeves 48, 50, jaw member 28. Sleeve members 48, 50, when sandwiched together, define three circumferentially spaced apart opening 52 of generally hourglass shape when viewed radially relative to shaft axis 12a, as in FIGS. 3 and 3A. Flange 32 includes three arcuate openings 32g separated by three radially extend spokes or reaction portions 32h which each extend radially through one of the hourglass openings 52. Each opening 52 includes self-energizing ramp surfaces 52a, 52b, 52c, 52d which cooperate with substantially parallel ramp surfaces defined by flange reaction portions 32h. FIGS. 1, 2 and 3 depict flange 32 in a neutral position wherein reaction portions 32h are disposed within waist portions 52e of each hourglass opening 52. While flange 32 is in the neutral position, the friction surfaces of the cone clutches are spaced apart. When it is desired to couple either gear to the shaft, an appropriate and unshown shift mechanism connected to the outer periphery of flange 32 in known manner moves the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by arrow $F_o$ in FIG. 3A. When reaction portions 32h are moved axially out of waist portions 52e, the ramps of openings 52 allow limited rotation of the flange relative jaw member 28 and shaft 12, and react synchronizing torque from the cone clutches to provide an additive axial self-energizing force for increasing the engaging force of the cone clutch initially engaged by a shift force applied to flange 32, thereby increasing the synchronizing torque provided by the cone clutch. Ramp surfaces may be provided for synchronizing one or both gears and/or for synchronizing in response to torque in either direction, as is encountered for up and down shifts. By way of example only, ramp surfaces 52a, 52b provide the additive axial force to increase synchronization of gear 16 in response to torque in either direction, and ramp surfaces 52c, 52d provide the additive axial force for gear 14 in response to torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the shaft splines. For example purposes only, ramp 52a and/or 52c could be parallel to the shaft axis 12a to provide no additive axial force in response to synchronizing torque.

Initial axial rightward movement of flange 32 by the shift mechanism engages flange chamfers 32f with pre-energizer chamfers 44b to effect movement of friction ring surface 38a into engagement with friction surface 26a. The initial engagement force of friction surfaces 38a, 26a is of course a function of the force of springs 46 and the angles of the chamfers. The initial frictional engagement (provided an asynchronous condition exists and momentarily ignoring the effect of the self-energizing ramps) produces an initial cone clutch engaging force and synchronizing torque To which ensures limited relative rotation between flange 32 and the engaged friction ring, and hence, movement of the reduced diameter pin portions 40b to the appropriate sides of the flange openings 32b to provide engagement of pin blocker shoulders 40d with flange blocker shoulders 32e. When the blocker shoulders are engaged, full operator shift force $F_o$ on flange 32 is transmitted to friction ring 38 via the blocker shoulders, whereby the cone clutch is engaged by the full force of the operator shift force $F_o$ and to provide a resultant operator synchronizing torque $T_o$. This operator synchronizing torque $T_o$ is represented by arrow $T_o$ in FIG. 3A. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32b to allow continued axial movement of the flange and engagement of the external jaw teeth 28c of jaw member 28 with internal jaw teeth of jaw member 16b. As is known in the prior art and as is specified by reference numbers only for jaw member 16b, the lead portions of the jaw teeth have rake leading edges 16c to reduce tooth damage during initial contact, and have chamfer or wedge faces 16d to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth.

Still ignoring the effects of the self-energizing ramps, cone clutch torque provided by the force $F_o$ is expressed by equation (1).

$$T_o=F_oR_c\mu_c/\sin\alpha \quad (1)$$

where:

$R_c$=the mean radius of the cone friction surface, $\mu_c$=the coefficient of friction of the cone friction surface, and $\alpha$=the angle of the cone friction surfaces.

Figure 3A:
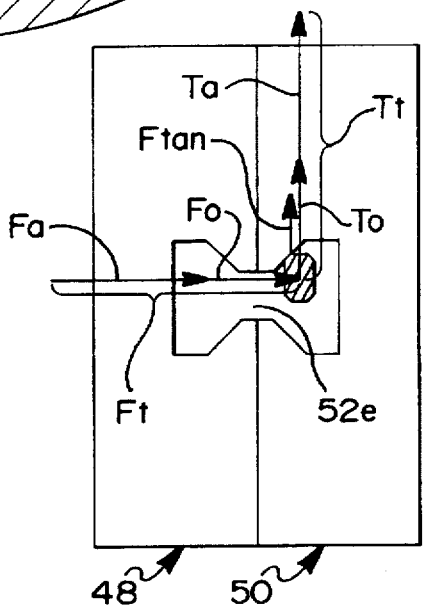

Looking now at the affects of the self-energizing ramps and referring particularly to FIGS. 3 and 3A, the synchronizing torque $T_o$, due to the operator applied axial shift force $F_o$, is of course transmitted to flange 32 by pins 40 and is reacted to shaft 12 across the self-energizing ramp surfaces. The self-energizing ramp surfaces limit rotation of the flange relative to shaft 12 and jaw member 28, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 3 illustrates the position of the self-energizing ramp surfaces while shift flange 32 is in the neutral position corresponding to the position of FIGS. 1 and 2. FIG. 3A illustrates a position of the ramps while gear 16 is being synchronized by engaged cone surfaces 26a, 38a. The engaged cone surfaces are producing a synchronizing torque in a direction which has effected engagement of flange reaction portions 32h with ramp surfaces 52a. Hence, the sum of the axial forces for engaging the cone clutch are $F_o$ plus $F_a$ and the sum of the synchronizing torques being produced by the cone clutch are $T_o$ plus $T_a$, as graphically shown in FIG. 3A. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward lockup. Self-locking rather than self-energizing decreases shift quality or feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase and decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. Herein, the pressure angle $\phi$ is zero.

The total synchronizing torque $T_t$ produced by the cone clutch is:

$$T_t=F_tR_c\mu_c/\sin\alpha \quad (2)$$

where $$T_t=T_o+T_a \quad (3)$$

and $$F_t=F_o+F_a \quad (4)$$

The equation for the axial additive force $F_a$, which is given without derivation, is $$F_a = F_{tan}\left[\frac{\cos\theta - \mu_r\sin\theta/\cos\phi}{\sin\theta + \mu_r\cos\theta/\cos\phi}\right] \quad (5)$$

where the ramp angle $\theta$ is measured from a plane normal to shaft axis 12a, and $F_{tan}$ acts on the ramps and is the tangential force component of torque $T_t$ at $R_r$. $T_t$ and $F_{tan}$ for one torque direction are represented by like referenced arrows in FIG. 2 and $F_{tan}$ is also shown in FIG. 3A. Therefore, $$F_{tan} = T/R_r \quad (6)$$

Substituting equations (5) and (6) into equation (4) and solving for $F_t$ gives $$F_1 = \frac{F_0}{1 - \left[\frac{\cos\theta - \mu_r\sin\theta/\cos\phi}{\sin\theta - \mu_r\cos\theta/\cos\phi}\right]\left[\frac{R_c\mu_c}{R_r\sin\alpha}\right]} \quad (7)$$

$F_t/F_o$ is defined as a boost or self-energizing ratio. The greater the boost ratio the greater the total synchronizer $T_t$ for a given operator force $F_o$. Boost ratios equal to one correspond to ramp angles $\theta$ of 90 degrees; such angles are parallel to the shaft splines or axis and provide no self-energizing. As $\theta$ decreases, the boost ratio increases. Boost ratios from 1:1 to about 5:1 have been employed. However, boost ratios greater than 1:1 and less than 5:1 are preferred. $F_t/F_o$ tends to infinity as the denominator of equation (7) tends to zero. This, of course, occurs when the minus term in the denominator of equation (7) approaches one. Accordingly, the ramps are self-energizing and not self-locking when $$\left[\frac{\cos\theta - \mu_r\sin\theta/\cos\phi}{\sin\theta - \mu_r\cos\theta/\cos\phi}\right]\left[\frac{R_c\mu_c}{R_r\sin\alpha}\right] < 1 \quad (8)$$

For a given synchronizer geometry, equation (8) may be simplified by setting $R_c$, $\mu_c$, $R_r$, and $\alpha$ equal to a constant K, wherein:

$$\frac{R_c\mu_c}{R_r\sin\alpha} = \frac{1}{K} \quad (9A)$$

OR $$\frac{R_r\sin\alpha}{R_c\mu_c} = K \quad (9B)$$

Substituting either of equations (9) into equation (8), re-arranging and solving for ramp angles $\theta$ gives equation (10) which provides minimum angles $\theta$. Such minimum angles produce self-energizing forces $F_a$ which are proportional to operator forces $F_o$, which provide maximum controllable boost ratios, and which are not self-locking.

$$\theta > \mathrm{TAN}^{-1}\left[\frac{1 - K\,\mu_r/\cos\phi}{K + \mu_r/\cos\phi}\right] \quad (10)$$

Since the ramp pressure angle $\phi$ is zero herein, cos $\phi$ equals one and may be deleted. Keeping in mind that $\theta$ is measured from a plane normal to shaft axis 12a, increasing values of angles $\theta$ therefore provide decreasing values of forces $F_a$ and torque $T_a$, and of course decreasing values of total torque $T_t$. Accordingly, as K increases, minimum angles $\theta$ may decrease, provided all other variables remain the same.

More specifically, to prevent self-locking and to keep forces $F_a$ proportional to $F_o$, minimum angles $\theta$ should increase:

as the ratio $R_c/R_r$ increases and/or, as the cone angle $\alpha$ decreases and/or, as the coefficient of clutch friction $\mu_c$ increases and/or, as the ramp pressure angle $\phi$ increases and/or, as the coefficient of ramp friction $\mu_r$ increases.

Also, when calculating minimum ramp angles for a so-called given geometry and a maximum desired boost ratio, a margin of safety is preferred to prevent self-locking or over boost due to manufacturing tolerances and due to normal wear of components.

Looking now at applications of synchronizer mechanisms 10 in a multi-ratio speed change transmission, as is known, the time required to synchronize a ratio gear decreases as the total synchronizing torque increases. Further, due to differences in reflected inertia, i.e., actual inertia of components being synchronized plus friction, the amount of work required to synchronize lower speed ratio gears is in general greater than that required for higher speed ratio gears; also, the amount of work required to synchronize a given ratio gear for downshifts is in general greater than that required for upshifts. Accordingly, when the synchronizer mechanisms disclosed herein are employed in a multi-ratio transmission, the mechanisms for lower speed ratio gears are preferably provided with higher boost ratios and the mechanisms for higher speed ratios are preferably provided with lower boost ratios. Also, for a given ratio gear, the boost ratio for downshifts is preferably greater than for upshifts. By so arranging the boost ratios, substantially equal shift or synchronizing times can be provided for all ratio gears of a transmission provided with the self-energizing synchronizer mechanisms. For the synchronizer mechanisms disclosed herein, the boost ratios are readily varied by varying the cone clutch angles $\alpha$, the radii ratio $R_c/R_r$, and the self-energizing ramp angles $\theta$.

As may be readily seen by reference to the drawings herein, flange 32 is disconnected from the torque path between shaft 12 and either of the ratio gears 14,16 when jaw member 28 is engaged with the jaw member of the associated gear. Accordingly, the relatively small and wear sensitive self-energizing ramps are never exposed to the deteriorating effects of the full torque loads of the ratio gears. This is particularly important as the self-energizing ramps are moved radially inward since the forces acting on the ramps increases with decreasing ramp radius relative to shaft axis 12a.

Further, due to radius differences, forces acting between jaw member splines 28a and shaft splines 12b are greater than the forces acting between the jaw clutch teeth. Accordingly, the axial length of the spline connection between jaw member splines 28a and shaft splines 12b are preferably greater than what is necessary for adequate strength for the jaw clutch teeth. This greater axial spline length connection is inherent in the disclosed embodiment without lengthening the stroke of the shift mechanism which moves flange 32 since flange 32 is not circumferentially fixed to jaw clutch members 28,30 or shaft 12; hence jaw member splines 28a may continuously mate with shaft splines 12b. This is particularly important when a vehicle operator moves the shift mechanism via a manually operated shift lever in known manner. An example of such lever may be seen by reference to U.S. Pat. No. 3,850,047 which is incorporated herein by reference. Such levers are commonly of the first class lever type wherein increased shift stroke requires either increased operator movement of the shift lever or (by change the lever fulcrum) decreased force applied to the shift mechanism for a given operator shift effort.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizer mechanism for a first gear secured against axial movement on a shaft having an axis about which the gear and shaft rotate relative to each other, the mechanism comprising:

first friction and jaw means respectively engagable with friction and jaw means affixed to the first gear for respectively synchronizing and positive connecting the first gear to the shaft in response to a shift force ($F_o$) axially directed toward the first gear moving a radially extending flange toward the first gear, means connecting the flange for axial movement with the first jaw means, and means connecting the first jaw means for rotation with the shaft; first and second blocker means operative when engaged for preventing engagement of the jaw means prior to the synchronizing, the first blocker means defined by a plurality of circumferentially spaced pin-like means rigidly extending axially from the first friction means and into openings in the flange, the second blocker means defined about the openings;

pre-energizer means for effecting an engaging force of the firction means in response to initial axial movement of the flange by the shift force ($F_o$) from a neutral position toward the first gear for engaging the first and second blocker means in response to engagement of the friction means producing an initial synchronizing torque transmitted to the flange via the pin-like means and for transmitting the shift force ($F_o$) to the first friction means via the first and second blocker means to increase the engaging force of the friction means; characterized by:

means for allowing limited circumferential movement of the flange relative to the shaft and reacting the synchronizing torque to the shaft; and the means for allowing limited circumferential movement includes first ramp means engagable with reaction means affixed with the flange in response to synchronizing torque in one direction for producing an axial additive force ($F_a$) on the flange in the direction of the shift force ($F_o$) for further increasing the force engaging the friction means.

2. The synchronizer mechanism of claim 1, wherein the means [limiting] *for allowing limited circumferential movement* includes second ramp means engagable with the reaction means in response to synchronizing torque opposite the one direction for producing another additive force ($F_a$) on the flange in the direction of the shift force ($F_o$) for increasing the total force engaging the friction means.

3. The synchronizer mechanism of claim 1, further including a second gear axially spaced from the first gear and secured against axial movement on the shaft for rotation about the shaft axis relative to the shaft and first gear;

second friction and jaw means respectively engagable with friction and jaw means affixed to the second gear for respectively synchronizing and positive connecting the second gear to the shaft in response to a shift force ($F_o$) axially directed toward the second gear for moving the flange toward the second gear, means connecting the second jaw means for axial movement [relative to] *with* the flange, and means connecting the second jaw means for rotation with the shaft;

third and fourth blocker means operative when engaged for preventing engagement of the second jaw means prior to the synchronizing, the third blocker means defined by a plurality of circumferentially spaced pin-like means rigidly extending axially from the second friction means and into openings in the flange, the fourth blocker means defined about the openings they extend through;

pre-energizer means for engaging the second friction means in response to initial axial movement of the flange by the shift force ($F_o$) from the neutral position toward the second gear, for engaging the third and fourth blocker means in response to engagement of the second friction means producing an initial synchronizing torque transmitted to the flange via the pin-like means extending from the second friction means and for transmitting the shift force ($F_o$) to the second friction means via the third and fourth blocker means to increase the engaging force of the second friction means; and the means [limiting] *for allowing limited circumferential movement* including third ramp means engagable with the reaction means in response to synchronizing torque in the one direction for producing an axial additive force ($F_a$) on the flange in the direction shift force ($F_o$) toward the second gear for further increasing the force engaging the second friction means.

4. The synchronizer mechanism of claim 3, including a second ramp means engagable with the reaction means in response to synchronizing torque in a direction opposite the one direction for further increasing the force engaging the first friction means.

5. The synchronizer mechanism of claim 3, including means securing the [circumferential retaining] means *for allowing circumferential movement* against axial movement relative to the shaft.

6. The synchronizer mechanism of claim 5, including means slidably interconnecting the first and second jaw means with the means [limiting and preventing relative rotation therebetween] *for allowing limited circumferential movement.*

7. The synchronizer mechanisms of claim 5, wherein the means [limiting] *for allowing circumferential movement* includes an annular sleeve assembly circumscribing the first and second jaw means.

8. The synchronizer mechanism of claim 3, wherein the pre-energizer means includes a plurality of circumferentially spaced openings in the flange and interspaced between the openings receiving the pin-like means, each pre-energizer opening slidably receiving a detent groove of a spring means when the flange is axially positioned in the neutral position, the spring means having opposite ends rigidly reacting between the first and second friction means, and the spring means being operative in response to axial movement of the flange toward either of the gears to resiliently move the friction means of the associated gear into engagement.

9. A pin-type synchronizer mechanism for first and second gears mounted for rotation and secured against axial movement on a shaft having an axis about which the gears and the shaft rotate, the mechanism comprising:

gear friction and gear jaw means affixed to each gear, the gear friction means engagable with first and second axially spaced apart and axially movable friction means for respectively synchronizing the first and second gears with the shaft, and the gear jaw means engagable with axially movable jaw means connected for rotation with the shaft;

a flange extending radially between the first and second friction means for axially moving the axially movable friction and jaw means into said engagement in response to an axially bi-directional shift force ($F_o$) applied to the flange, means connecting the axially movable jaw means for axial movement with the flange;

blocker means operative when engaged for preventing engagement of the jaw means prior to the synchronizing, the blocker means including a plurality of circumferentially spaced pins rigidly extending axially between the first and second friction means and into openings in the flange, each of the pins having a blocker shoulder engagable with a blocker shoulder defined about the associated opening;

pre-energizer means for effecting an engaging force for either one of the first and second friction means in response to initial axial movement of the flange by the shift force ($F_o$) from a neutral position toward one of the gears, for engaging the blocker means in response to engagement of the friction means producing an initial synchronizing torque transmitted to the flange via the pins, and for transmitting the shift force ($F_o$) to the engaged friction means via the engaged blocker means to increase the engaging force of the engaged friction means; characterized by:

means for allowing limited circumferential movement of the flange relative to the axially movable jaw means and shaft and for reacting the synchronizing torque to the shaft; and the means [limiting] *for allowing limited circumferential movement* including first ramp means engagable with reaction means affixed with the flange in response to synchronizing torque of at least the first gear and in at least one direction for producing an axial additive force ($F_a$) on the flange in the direction of the shift force ($F_o$) for increasing the force engaging the friction means associated with the first gear.

10. The synchronizer mechanism of claim 9, wherein the means [limiting] *for allowing limited circumferential movement* includes a third ramp means engagable with the reaction means in response to synchronizing torque of the second gear in the one direction for producing another additive force ($F_a$) on the flange in the direction of the shift force ($F_o$) for increasing the force engaging the friction means associated with the second gear.

11. The synchronizer mechanism of claim 10, wherein the means [limiting] *for allowing limited circumferential movement* includes a second ramp means engagable with the reaction means in response to synchronizing torque of the first gear in a direction opposite the one direction for producing another additive force ($F_a$) on the flange in the direction of the shift force ($F_o$) for increasing the force engaging the friction means associated with the first gear.

*12. A clutch for frictionally synchronizing and positive connecting first and second drives disposed for relative rotation about a common axis; the clutch comprising:*

*first jaw means axially movable into engagement with second jaw means for positive connecting the drives in response to engaging movement of first jaw means by an axially directed shift force (Fo);*

*first friction means axially movable into engagement with second friction means in response to the engaging movement of the first jaw means for producing a synchronizing torque;*

*first and second blocker means movable into engagement in response to the engaging movement of the first jaw means for preventing asynchronous engagement of the jaw means, for transmitting the shift force (Fo) to the first friction means to effect an engagement force of the friction means, and for producing a torque counter to the synchronizing torque for moving the first and second blocker means out of engagement as synchronization is reached;*

*first and second self-energizing means operative when engaged to react the synchronizing torque for producing an additive axial force (Fa) in the direction of the shift force (Fo) for increasing the engagement force of the friction means; characterized by:*

*the first jaw means including a central opening having internal splines with axially extending flank surfaces slidably mating continuously with axially extending flank surfaces of external splines affixed against rotation and axial movement relative to the first drive;*

*the first and second self-energizing means including means for directing the additive axial force (Fa) to the first friction means via the blocker means.*

*13. The clutch of claim 12, further including:*

*the first blocker means being affixed to the first friction means;*

*means for allowing limited rotation of the first friction means between first and second positions relative to the first drive; and*

*pre-energizer means for moving the first friction means into an initial frictional engagement with the second friction means in response to initial engaging movement of the first jaw means by the shift force (Fo) from a neutral position for effecting rotation of the first friction means to one of said positions and aligning the second blocker means for engagement with the first blocker means.*

*14. The clutch of claim 12, wherein:*

*the self-energizing means includes first angled surface means affixed against rotation and axial movement relative to one of the drives, second angled surface means engageable with the first angled surface means for producing the additive axial force (Fa), means mounting the second angled surface means for limited rotation relative to first jaw means.*

*15. The clutch of claim 12, including:*

*a radially extending flange acted on by the shift force (Fo) for effecting the engaging movement of the first jaw means;*

*the first blocker means defined by a plurality of circumferentially spaced pin-like means rigidly extending axially from the first friction means and into openings in the flange, the second blocker means defined about the openings;*

*the self-energizing means including means for allowing limited circumferential movement of the flange relative to the first drive and for reacting the synchronizing torque to the first drive; and*

*the means allowing limited circumferential movement includes first ramp means engageable with reaction means affixed with the flange in response to the synchronizing torque for producing the axial additive force (Fa).*

*16. The clutch of claim 12, wherein the means for directing the additive axial force ($F_a$) is interposed between the first jaw means and the second blocker means and is movable axially relative to the first drive and circumferentially relative to the first jaw means.*

*17. The clutch of claim 16, wherein:*

*the means for directing the additive axial force ($F_a$) is secured against radial movement relative to the second blocker means.*

*18. A clutch for frictionally synchronizing and positive connecting first and second drives disposed for relative rotation about a common axis and secured against relative axial movement; the clutch comprising:*

*first jaw means axially movable into engagement with second jaw means for positive connecting the drives in response to engaging movement of first jaw means by an axially directed shift force ($F_o$);*

*first friction means axially movable into engagement with second friction means in response to the engaging movement of the first jaw means for producing a synchronizing torque;*

*first and second blocker means movable into engagement in response to the engaging movement of the first jaw means for preventing asynchronous engagement of the jaw means, for transmitting the shift force ($F_o$) to the first friction means to effect an engagement force of the friction means, and for producing a torque counter to the synchronizing torque for moving the first and second blocker means out of engagement as synchronization is reached;*

*self-energizing means including first ramp means and reaction means operative when engaged to react the synchronizing torque in one direction and axially between the drives for producing an additive axial force ($F_a$) in the direction of the shift force ($F_o$) for increasing the engagement force of the friction means; characterized by:*

*the first jaw means including a central opening having internal splines with axially extending flank surfaces slidably mating continuously with axially extending flank surfaces of external splines affixed against rotation and axial movement relative to the first drive; and*

*the self-energizing means including means for directing the additive axial force ($F_a$) to the first friction means via the blocker means.*

*19. The clutch of claim 18, wherein:*

*the means for directing the additive axial force ($F_a$) is interposed between the first jaw means and the second blocker means and is movable axially relative to the first drive and circumferentially relative to the first jaw means.*

*20. The clutch of claim 18, further including:*

*the first blocker means being affixed to the first friction means; means for allowing limited rotation of the first friction means between first and second positions relative to the first drive; and*

*pre-energizer means for moving the first friction means into an initial frictional engagement with the second friction means in response to initial engaging movement of the first jaw means by the shift force ($F_o$) from a neutral position for effecting rotation of the first friction means to one of said positions and aligning the second blocker means for engagement with the first blocker means.*

*21. The clutch of claim 18, including:*

*a radially extending flange acted on by the shift force ($F_o$) for effecting the engaging movement of the first jaw means;*

*the first blocker means defined by a plurality of circumferentially spaced pin-like means rigidly extending axially from the first friction means and into openings in the flange, the second blocker means defined about the openings;*

*the self-energizing means including means for allowing limited circumferential movement of the flange relative to the first drive and for reacting the synchronizing torque to the first drive; and*

*the means allowing limited circumferential movement includes the first ramp means and the reaction means affixed with the flange.*

*22. The synchronizer mechanism of claim 21, wherein:*

*the self-energizing means includes second ramp means engagable with the reaction means in response to synchronizing torque opposite the one direction for producing another additive force ($F_a$) on the flange in the direction of the shift force ($F_o$) for increasing the total force engaging the friction means.*

*23. The synchronizer mechanism of claim 21, further including: a third drive axially spaced from the second drive and secured against axial movement and for rotation about the common axis relative to the first and second drives;*

*third friction and jaw means respectively engagable with fourth friction and jaw means affixed to the third drive for respectively synchronizing and positive connecting the third drive to the first drive in response to the shift force ($F_o$) axially directed toward the third drive moving the flange toward the third drive, means connecting the third jaw means for axial movement with the flange, and means connecting the third jaw means for rotation with the first drive;*

*third and fourth blocker means operative when engaged for preventing engagement of the third jaw means prior to the synchronizing, the third blocker means defined by a plurality of circumferentially spaced pin-like means rigidly extending axially from the third friction means and into openings in the flange, the fourth blocker means defined about the openings they extend through;*

*pre-energizer means for engaging the third friction means in response to initial axial movement of the flange by the shift force ($F_o$) from the neutral position toward the third drive, for engaging the third and fourth blocker means in response to engagement of the third friction means producing an initial synchronizing torque transmitted to the flange via the pin-like means extending from the third friction means and for transmitting the shift force ($F_o$) to the third friction means via the third and fourth blocker means to increase the engaging force of the third friction means; and*

*the self-energizing means including third ramp means engagable with the reaction means in response to synchronizing torque in the one direction for producing an axial additive force ($F_a$) on the flange in the direction of the shift force ($F_o$) toward the third drive for further increasing the force engaging the third friction means.*

*24. The synchronizer mechanism of claim 23, wherein the self-energizing means includes a fourth ramp means engagable with the reaction means in response to synchronizing torque in the direction opposite the one direction for further increasing the force engaging the third friction means.*

*25. The synchronizer mechanism of claim 24 wherein:*

*the second and third drives prevent axial movement of the ramps.*

*26. The synchronizer mechanism of claim 22, further including: a third drive axially spaced from the second drive and secured against axial movement and for rotation about the common axis relative to the first and second drives;*

*third friction and jaw means respectively engagable with fourth friction and jaw means affixed to the third drive for respectively synchronizing and positive connecting the third drive to the first drive in response to the shift force ($F_o$) axially directed toward the third drive moving the flange toward the third drive, means connecting the third jaw means for axial movement with the flange, and means connecting the third jaw means for rotation with the first drive;*

*third and fourth blocker means operative when engaged for preventing engagement of the third jaw means prior to the synchronizing, the third blocker means defined by a plurality of circumferentially spaced pin-like means rigidly extending axially from the third friction means and into openings in the flange, the fourth blocker means defined about the openings they extend through;*

*pre-energizer means for engaging the third friction means in response to initial axial movement of the flange by the shift force ($F_o$) from the neutral position toward the third drive, for engaging the third and fourth blocker means in response to engagement of the third friction means producing an initial synchronizing torque transmitted to the flange via the pin-like means extending from the third friction means and for transmitting the shift force ($F_o$) to the third friction means via the third and fourth blocker means to increase the engaging force of the third friction means; and*

*the self-energizing means including third ramp means engagable with the reaction means in response to synchronizing torque in the one direction for producing an axial additive force ($F_a$) on the flange in the direction of the shift force ($F_o$) toward the third drive for further increasing the force engaging the third friction means.*

*27. The synchronizer mechanism of claim 26, wherein the self-energizing means includes a fourth ramp means engagable with the reaction means in response to synchronizing torque in the direction opposite the one direction for further increasing the force engaging the third friction means.*

*28. The synchronizer mechanism of claim 27 wherein:*

*the second and third drives prevent axial movement of the ramps.*

*29. The synchronizer mechanism of claim 26 wherein:*

*the second and third drives prevent axial movement of the ramps.*

*30. The clutch of claim 12, wherein:*

*the means for directing the additive axial force ($F_a$) directs the additive axial force ($F_a$) in a direction not opposing the shift force ($F_o$).*

*31. The clutch of claim 12, wherein:*

*the means for directing the additive axial force ($F_a$) is secured against radial movement relative to the second blocker means.*

*32. The clutch of claim 12, wherein the first and second self-energizing means include first ramp means and a reaction means which react the synchronizing torque between means fixed axially relative to each other.*

*33. The clutch of claim 12, including:*

*pre-energizer means including resilient means operative in response to initial engaging movement of the first jaw means by the shift force ($F_o$) to resiliently transmit an initial engaging force to the first friction means via a path independent of the blocker means, the initial engaging force for effecting rotation of the first friction means to one of said positions and aligning the second blocker means for engagement with the first blocker means.*

*34. The clutch of claim 18, wherein:*

*the means for directing the additive axial force ($F_a$) directs the additive axial force ($F_a$) in a direction not opposing the shift force ($F_o$).*

*35. The clutch of claim 18, wherein:*

*the means for directing the additive axial force ($F_a$) is secured against radial movement relative to the second blocker means.*

*36. The clutch of claim 19, wherein:*

*the means for directing the additive axial force ($F_a$) is secured against radial movement relative to the second blocker means.*

*37. The clutch of claim 18 including:*

*pre-energizer means including resilient means operative in response to initial engaging movement of the first jaw means by the shift force ($F_o$) to resiliently transmit an initial engaging force to the first friction means via a path independent of the blocker means, the initial engaging force for effecting rotation of the first friction means to one of said positions and aligning the second blocker means for engagement with the first blocker means.*

* * * * *